United States Patent Office 3,527,120
Patented Sept. 8, 1970

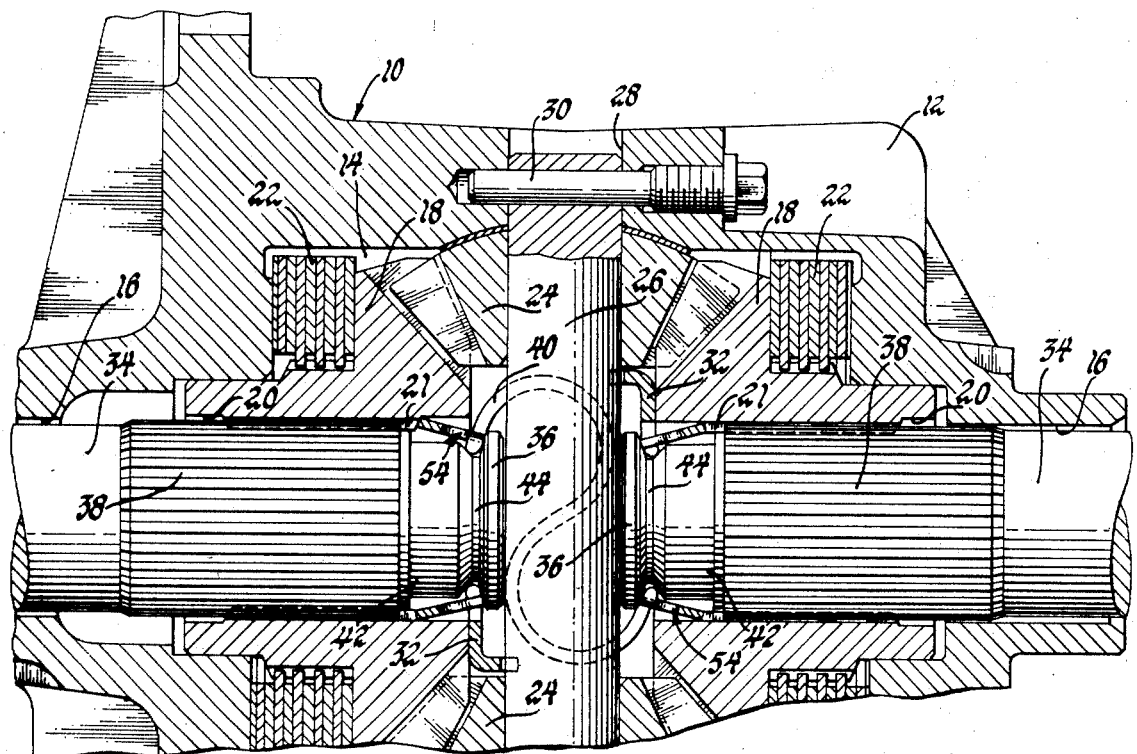
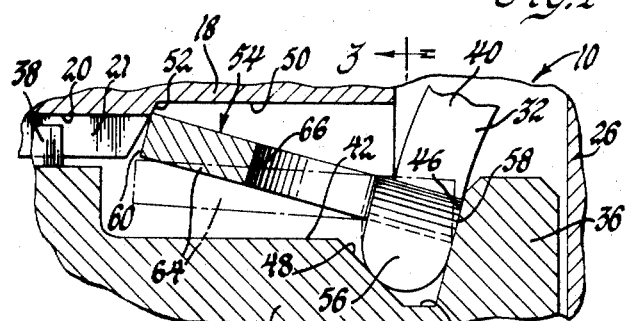
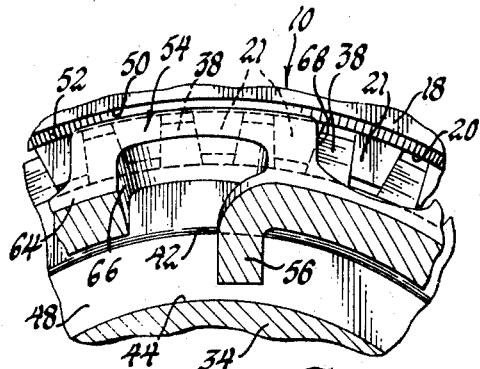
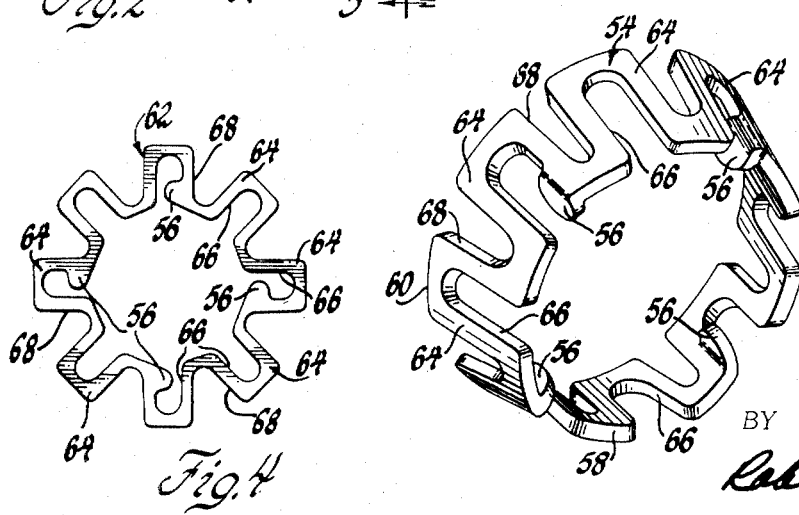
INVENTORS.
*Morris J. Duer, &*
BY *Thomas J. Krieg*
*Robert J. Outland*
ATTORNEY

3,527,120
DIFFERENTIAL ASSEMBLY AND AXLE SHAFT RETAINER THEREFOR
Morris J. Duer, Lansing, and Thomas J. Krieg, East Lansing, Mich., assignors to General Motors Corporation, Detroit, Mich., a corporation of Delaware
Filed July 1, 1968, Ser. No. 741,503
Int. Cl. F16h *1/44;* F16b *21/08;* F16d *1/06*
U.S. Cl. 74—711                                    6 Claims

ABSTRACT OF THE DISCLOSURE

In a preferred embodiment, a limited slip differential includes axle shaft retaining means including a spring steel member retained on the axle shaft by tangs engaging a groove formed on the shaft. The body of the retainer is flexible outwardly for installation on the axle shaft and flexes inwardly so as to permit sliding the axle shaft through the differential case and side gear openings into its installed position. Upon installation, the retainer fingers spring outwardly into engagement with abutting surfaces of the side gear so as to lock the axle shaft in position and prevent outward axial movement thereof.

FIELD OF THE INVENTION

This invention relates to differential assemblies especially of the type for use in motor vehicles and more particularly to means for retaining the axle shafts in such differentials.

DESCRIPTION OF THE PRIOR ART

In certain conventional vehicle differential constructions, it is known to retain the axle shafts from outward axial movement with respect to their associated side gears by providing grooves adjacent the inner ends of the axle shafts and supplying locking devices such as C-shaped washers which engage the grooves and seat in recesses of the side gears. Installation of the pinion shaft prevents the C washers from being unseated and thus fixes the position of the axle shafts.

While such arrangements have been quite successfully used in certain differentials, they require, in order to install an axle shaft, the partial disassembly of the differential by removing the cover, lock pin and pinion shaft so that the C washers can be installed. Additionally, such arrangements would be difficult, if not impossible, to use in conjunction with certain limited slip differential arrangements in which an S-shaped leaf type preload spring is located between and engages the inner faces of the side gears.

SUMMARY OF THE INVENTION

The present invention provides a resilient axle shaft retainer for use in conjunction with bevel gear differentials having axle shafts and side gears slightly modified from those of a conventional differential assembly. The arrangement is also compatible with the use of the S-shaped leaf spring of a limited slip differential assembly. The retainer member is of simple design and may be formed from a flat spring steel sheet. The retainer is arranged to be installed on the axle shaft before assembly and the axle shaft is then slipped into place and locked without requiring disassembly of the other differential components.

Other features and advantages of the invention will be apparent from the following description of a preferred embodiment taken in conjunction with the drawing.

BRIEF DESCRIPTION OF THE DRAWING

In the drawing:
FIG. 1 is a cross-sectional view of a limited slip differential employing axle shaft retaining means according to the invention;
FIG. 2 is an enlarged view of a portion of FIG. 1 showing the installed position of the axle shaft retainer;
FIG. 3 is a cross-sectional view taken in the plane indicated by the line 3—3 of FIG. 2;
FIG. 4 is a plan view showing the flat sheet metal blank from which the axle shaft retainer may be formed and
FIG. 5 is a pictorial view illustrating the formed axle shaft retainer in its free position.

DESCRIPTION OF THE PREFERRED EMBODIMENT

Referring now to the details shown in the drawing, numeral 10 generally indicates a limited slip differential having a case 12 which is rotatably mountable within the differential housing (not shown) of a vehicle so as to be driven by the engine. Casing 12 defines the usual cavity 14 having opposed axle receiving bores 16.

Within the cavity 14 are a pair of oppositely disposed side gears 18 each of which includes an axle receiving opening 20 having internal splines 21 and aligned with the bores 16 of the case. A multi-plate clutch pack 22 is arranged between each of the side gears and the differential case and includes alternate clutch plates engaging the side gears and the case in a well known manner.

Both the side gears engage a pair of pinion gears 24 which are rotatably carried on a transversely extending pinion shaft 26 having its ends disposed in openings 18 of the case and retained therein by a cross pin 30. In the space between the pinion and side gears, an S-shaped leaf spring 32 is disposed so as to bear against the inner surfaces of the side gears 18 and urge them outwardly.

A pair of axle shafts 34 extend through bores 16 of the case and openings 20 of the side gears with their ends 36 closely spaced from or engaging the pinion shaft 26. Splines 38 are provided on the shafts which engage the internal splines 21 of their respective side gears to drivably connect the gears and their shafts for rotation together. The center portion of spring 32 has an elongated opening 40 which provides clearance for the pinion shaft 26 and the ends 36 of the axle shafts.

Adjacent their inner ends, axle shafts 34 include a reduced diameter portion 42 which terminates toward the outer end of the shaft in a circumferential groove 44 having outer and inner surfaces 46, 48 respectively. Surrounding the reduced diameter portion 42 of the axle shafts, each side gear is provided with an enlarged inner diameter 50 which terminates in an abutting surface 52 at the end of the splines 21.

Within the annular spaces formed by reduced diameter portions 42 of the shaft and enlarged inner diameters 50 of the side gears are disposed retainer members 54, best shown in FIGS. 2, 3 and 5. Retainer members are preferably formed of spring steel and include several tangs 56 which are received in grooves 44. In the installed position, as shown in FIG. 2, the smaller end 58 of each retainer member is arranged to bear against the outer surface 46 of the groove 44 while the larger end 60 is arranged to engage the abutting surface 52 of the associated side gear 18 so as to prevent the axle shaft 34 from being moved outwardly with respect to its associated side gear.

Retainer members 54 are preferably made from a flat sheet of spring steel which is stamped or otherwise cut into a flat blank 62 having the shape shown in FIG. 4. The blank includes a plurality of radially extending fingers 64 having radially inwardly opening slots 66 and connected inwardly of outward opening notches 68. Tangs 56 extend from one side of certain of the notches 66.

After cutting, the blank 62 is formed into the generally frusto-conical shape indicated in FIG. 5, which illustrates the free configuration of the retainer members 54. In this form, slots 66 open toward the smaller end of the retainer members while notches 68 are narrowed so as to form outwardly opening slots spaced from and alternating with slots 66. Tangs 56 are, at the same time, bent inwardly as shown.

The final configuration of the retainer members 54 provides a very flexible construction which permits the smaller end to be expanded in diameter sufficiently to install the retainers on their respective axle shafts 34 with their tangs 56 engaging grooves 44 before the axle shafts are installed in the differential 10. The axle shafts may then be assembled into the differential while the other components remain fully assembled merely by inserting the ends of the axle shafts into their respective case bores 16 and sliding them inwardly until they engage pinion shaft 26. During this movement, tangs 56 hold retainers 54 on their respective shafts and the body or finger portions 64 of the retainers are flexed inwardly to the position shown by the phantom lines of FIG. 2.

In this position, the retainers slide easily through bores 16 of the case as well as the splined openings 20 of the side gears until they reach their assembled positions where the resilience of the retainers causes the fingers to spring outwardly to the assembled position shown in solid lines in FIG. 2. This action locks the shafts in place with their respective side gears as previously described.

It should be noted that the clearance opening 40 in spring 32 permits the use of the novel retainer members 54 while the application of more conventional C lock washers would be impractical.

In order to remove an axle shaft from the differential case it would be necessary to open the differential housing and remove the cross pin and pinion shaft so as to permit the insertion of a suitable tool for springing the retainer fingers 64 inwardly prior to withdrawing the axle shaft. After this, however, the differential could be reassembled and a new axle shaft reinstalled without again disassembling the differential construction.

While the invention has been described by reference to a preferred embodiment chosen for purposes of illustration, it should be apparent that numerous changes could be made in the construction shown within the spirit and scope of the inventive concepts involved.

We claim:
1. A differential assembly comprising
    a rotatable case having a cavity and a pair of opposed axle receiving openings,
    a pair of side gears rotatably retained in said case on opposite sides of said cavity and each having an axle receiving opening aligned with one of said case openings,
    means drivably interconnecting said case and said side gears,
    a pair of axle shafts, one extending through each of said case openings and the opening of one of said side gears and being drivably connected with said one side gear,
    and the improvement comprising
    resilient retaining means secured adjacent the inner ends of each of said axle shafts and engaging the associated side gears to prevent axial outward movement of the axle shafts with respect to their associated side gears, each said retaining means comprising a resilient body having in its free position a hollow frusto-conical configuration, said body having a plurality of slots spaced therearound, said slots opening alternately to opposite ends and extending partially thereacross in spaced overlapping relationship and groove engaging portions comprising tangs extending from one side of certain slots at one end of said body,
    said axle shafts each having circumferential groove adjacent the inner end thereof, said groove being engaged by said tangs for retention of said retaining means on each of said shafts, said retaining means being attachable to said axle shafts before installation in said assembly and being yieldable so as to pass through said case and side gear openings with the ends of said shafts, said retaining means being adapted to spring into locking engagement with their associated side gears upon installation of their respective axle shafts.

2. The assembly of claim 1 wherein said axle shafts include reduced diameter portions inwardly adjacent said grooves to receive said retaining means body for passage through said openings during installation of said axle shafts in said assembly, and said side gears include abutting surfaces engaged by said retaining means for retention of said axle shafts in assembly.

3. The axle retainer for use in a differential and comprising
    a resilient body having in its free position a hollow generally frusto-conical configuration with a plurality of longitudinal slots spaced therearound, said slots opening alternately to opposite ends and extending partially thereacross in spaced overlapping relationship and
    a plurality of tangs arranged at the smaller end of said body.

4. The retainer of claim 3 wherein said retainer is cut from flat sheet metal and thereafter deformed to said frusto-conical shape.

5. The retainer of claim 3 wherein said tangs extend from one side of certain of said slots at said body smaller end.

6. The retainer of claim 4 wherein said tangs extend from one side of certain of said slots at said body smaller end.

References Cited

UNITED STATES PATENTS

| | | | |
|---|---|---|---|
| 1,407,570 | 2/1922 | Peirce. | |
| 1,430,367 | 9/1922 | Ford | 74—713 |
| 1,446,545 | 2/1923 | Brush et al. | 74—713 X |
| 2,570,003 | 10/1951 | Palmer | 85—8.8 X |
| 2,798,748 | 7/1957 | Maurer | 287—52.04 X |
| 3,224,299 | 12/1965 | Holdeman et al. | 74—711 |
| 3,389,923 | 6/1968 | Love et al. | 85—8.8 X |
| 3,439,786 | 4/1969 | Schmid | 74—710.5 X |

FOREIGN PATENTS 1,346,933  11/1963  France.

DONLEY J. STOCKING, Primary Examiner

T. C. PERRY, Assistant Examiner

U.S. Cl. X.R.

74—713; 85—8.8; 287—52.04

PO-1050
(5/69)

UNITED STATES PATENT OFFICE
CERTIFICATE OF CORRECTION

Patent No. 3,527,120            Dated September 8, 1970

Inventor(s) Morris J. Duer and Thomas J. Krieg

It is certified that error appears in the above-identified patent and that said Letters Patent are hereby corrected as shown below:

In Column 2, Line 34, "18" should be --28--.

In Column 4, Line 31, "The" should be --An--.

SIGNED AND
SEALED
FEB 1970

Febuary 2, 1971

(SEAL)
Attest:

Edward M. Fletcher, Jr
Attesting Officer

WILLIAM E. SCHUYLER, JR.
Commissioner of Patents